US007199165B2

(12) United States Patent
Kassa et al.

(10) Patent No.: US 7,199,165 B2
(45) Date of Patent: Apr. 3, 2007

(54) EXPANDABLE MATERIAL

(75) Inventors: Abraham Kassa, Shelby Township, MI (US); Matthew Harthcock, Oakland Township, MI (US); Jeffrey Apfel, Shelby Township, MI (US)

(73) Assignee: L & L Products, Inc., Romeo, MI (US)

( * ) Notice: Subject to any disclaimer, the term of this patent is extended or adjusted under 35 U.S.C. 154(b) by 0 days.

(21) Appl. No.: 10/867,835

(22) Filed: Jun. 15, 2004

(65) Prior Publication Data

US 2004/0266898 A1 Dec. 30, 2004

Related U.S. Application Data

(60) Provisional application No. 60/482,897, filed on Jun. 26, 2003.

(51) Int. Cl.
*C08J 9/00* (2006.01)

(52) U.S. Cl. .................. 521/135; 521/92; 521/95; 521/134; 521/142; 521/178

(58) Field of Classification Search ............... 521/135, 521/178, 92, 94, 132, 142
See application file for complete search history.

(56) References Cited

U.S. PATENT DOCUMENTS

| | | | |
|---|---|---|---|
| 3,860,541 A * | 1/1975 | Lehmann et al. ............ 525/523 |
| 4,138,462 A * | 2/1979 | Procida et al. ............... 264/347 |
| 4,427,481 A | 1/1984 | Smith et al. |
| 4,538,380 A | 9/1985 | Colliander |
| 4,601,769 A | 7/1986 | DeHoff |
| 4,693,775 A | 9/1987 | Harrison |
| 4,724,243 A | 2/1988 | Harrison |
| 4,749,434 A | 6/1988 | Harrison |
| 4,769,166 A | 9/1988 | Harrison |
| 4,778,845 A | 10/1988 | Tschan et al. |
| 4,833,191 A * | 5/1989 | Bushway et al. ............ 524/473 |
| 4,871,590 A | 10/1989 | Merz et al. |
| 4,898,630 A | 2/1990 | Kitoh et al. |
| 4,908,273 A | 3/1990 | Urech et al. |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,074,913 A * | 12/1991 | Trivett ..................... 106/14.34 |
| 5,124,186 A | 6/1992 | Wycech |
| 5,266,133 A | 11/1993 | Hanley et al. |
| 5,274,006 A * | 12/1993 | Kagoshima et al. ........... 521/85 |
| 5,342,873 A | 8/1994 | Merz et al. |
| 5,358,397 A | 10/1994 | Ligon et al. |
| 5,382,606 A | 1/1995 | Butikofer |
| 5,470,886 A | 11/1995 | Makhlouf et al. |
| 5,475,039 A | 12/1995 | Butikofer |
| 5,648,401 A | 7/1997 | Czaplicki et al. |
| 5,712,317 A | 1/1998 | Makhlouf et al. |
| 5,766,719 A | 6/1998 | Rimkus |
| 5,783,272 A | 7/1998 | Wong |
| 5,884,960 A | 3/1999 | Wycech |
| 5,894,071 A | 4/1999 | Merz et al. |
| 5,932,680 A | 8/1999 | Heider |
| 5,948,508 A | 9/1999 | Pastore et al. |
| 5,964,979 A | 10/1999 | George et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A | 2/2000 | Johnson et al. |
| 6,040,350 A | 3/2000 | Fukui |
| 6,057,382 A | 5/2000 | Karim et al. |
| 6,068,922 A | 5/2000 | Vercesi et al. |
| 6,077,884 A | 6/2000 | Hess et al. |
| 6,096,791 A | 8/2000 | Born et al. |
| 6,103,784 A | 8/2000 | Hilborn et al. |
| 6,131,897 A | 10/2000 | Barz et al. |
| 6,133,335 A | 10/2000 | Mahoney et al. |
| 6,136,398 A | 10/2000 | Willett et al. |
| 6,136,944 A | 10/2000 | Stewart et al. |
| 6,153,302 A | 11/2000 | Karim et al. |
| 6,162,504 A | 12/2000 | Hubert et al. |
| 6,174,932 B1 | 1/2001 | Pachl et al. |
| 6,218,442 B1 | 4/2001 | Hilborn et al. |
| 6,228,449 B1 | 5/2001 | Meyer |
| 6,232,433 B1 | 5/2001 | Narayan |
| 6,235,842 B1 | 5/2001 | Kuwano et al. |
| 6,263,635 B1 | 7/2001 | Czaplicki |
| 6,270,600 B1 | 8/2001 | Wycech |
| 6,277,898 B1 | 8/2001 | Pachl et al. |
| 6,287,669 B1 | 9/2001 | George et al. |
| 6,296,298 B1 | 10/2001 | Barz |
| 6,303,672 B1 | 10/2001 | Papalos et al. |
| 6,311,452 B1 | 11/2001 | Barz et al. |
| 6,312,668 B2 | 11/2001 | Mitra et al. |
| 6,319,964 B1 | 11/2001 | Blank et al. |

(Continued)

FOREIGN PATENT DOCUMENTS

CA 2 425 414 4/2002

(Continued)

OTHER PUBLICATIONS

Dvorko, "One-Part Epoxy Compounds and Derived Foam Plastics", published Apr. 13, 2004.

(Continued)

*Primary Examiner*—Irina S. Zemel
(74) *Attorney, Agent, or Firm*—Dobrusin & Thennisch PC

(57) ABSTRACT

An expandable material and articles incorporating the same are disclosed. The material includes a polymeric admixture; a blowing agent; a curing agent; a tackifier; and optionally, a filler or fiber.

19 Claims, No Drawings

U.S. PATENT DOCUMENTS

| | | | |
|---|---|---|---|
| 6,348,513 B1 | 2/2002 | Hilborn et al. |
| 6,350,791 B1 | 2/2002 | Feichtmeier et al. |
| 6,358,584 B1 | 3/2002 | Czaplicki |
| 6,376,564 B1 | 4/2002 | Harrison |
| 6,403,222 B1 | 6/2002 | Harrison |
| 6,419,305 B1 | 7/2002 | Larsen |
| 6,429,244 B1 | 8/2002 | Rinka et al. |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,467,834 B1 | 10/2002 | Barz et al. |
| 6,471,285 B1 | 10/2002 | Czaplicki et al. |
| 6,479,560 B2 | 11/2002 | Freitag et al. |
| 6,482,486 B1 | 11/2002 | Czaplicki et al. |
| 6,486,256 B1 | 11/2002 | Tarbutton et al. |
| 6,506,494 B2 | 1/2003 | Brandys et al. |
| 6,546,693 B2 | 4/2003 | Wycech |
| 6,548,593 B2 | 4/2003 | Merz et al. |
| 6,561,571 B1 | 5/2003 | Brennecke |
| 6,573,309 B1 | 6/2003 | Reitenbach et al. |
| 6,607,831 B2 | 8/2003 | Ho et al. |
| 6,617,366 B2 | 9/2003 | Sueda et al. |
| 6,620,501 B1 | 9/2003 | Kassa et al. |
| 6,634,698 B2 | 10/2003 | Kleino |
| 6,668,457 B1 | 12/2003 | Czaplicki |
| 6,682,818 B2 | 1/2004 | Czaplicki et al. |
| 6,706,772 B2 | 3/2004 | Czaplicki et al. |
| 6,730,713 B2 | 5/2004 | Czaplicki |
| 6,740,067 B2 * | 5/2004 | Leise et al. ............... 604/332 |
| 6,740,379 B1 | 5/2004 | Congard |
| 6,740,399 B1 | 5/2004 | George et al. |
| 6,753,379 B1 | 6/2004 | Kawate et al. |
| 6,774,171 B2 | 8/2004 | Kassa |
| 6,776,869 B1 | 8/2004 | Schenkel |
| 6,777,079 B2 | 8/2004 | Zhou et al. |
| 6,787,065 B1 | 9/2004 | Schapira et al. |
| 6,787,579 B2 | 9/2004 | Czaplicki et al. |
| 6,787,593 B2 | 9/2004 | Bell et al. |
| 6,787,605 B2 | 9/2004 | Clough et al. |
| 6,787,606 B1 | 9/2004 | Chen |
| 6,790,597 B2 | 9/2004 | Dershem et al. |
| 6,790,906 B2 | 9/2004 | Chaignon et al. |
| 6,797,371 B1 | 9/2004 | Gehlsen et al. |
| 6,800,157 B2 | 10/2004 | Tarbutton et al. |
| 6,800,680 B2 | 10/2004 | Stark et al. |
| 6,805,768 B2 | 10/2004 | Agarwal et al. |
| 6,806,320 B2 | 10/2004 | Everaerts et al. |
| 6,811,864 B2 | 11/2004 | Czaplicki et al. |
| 6,838,509 B2 | 1/2005 | Shimo et al. |
| 6,846,559 B2 | 1/2005 | Czaplicki et al. |
| 6,884,854 B2 | 4/2005 | Schoenfeld et al. |
| 6,887,914 B2 | 5/2005 | Czaplicki et al. |
| 6,890,964 B2 | 5/2005 | Czaplicki et al. |
| 6,894,082 B2 | 5/2005 | Brantl et al. |
| 6,911,109 B2 | 6/2005 | Giroux et al. |
| 6,991,237 B2 | 1/2006 | Kassa et al. |
| 2002/0009582 A1 | 1/2002 | Golden |
| 2002/0013389 A1 | 1/2002 | Taylor et al. |
| 2002/0120064 A1 | 8/2002 | Khandpur et al. |
| 2002/0123575 A1 | 9/2002 | Kato et al. |
| 2002/0136891 A1 | 9/2002 | Khandpur et al. |
| 2002/0137808 A1 | 9/2002 | Gehlsen et al. |
| 2003/0045620 A1 | 3/2003 | Carlson et al. |
| 2003/0050352 A1 | 3/2003 | Guenther et al. |
| 2003/0060522 A1 | 3/2003 | Czaplicki et al. |
| 2003/0069335 A1 | 4/2003 | Czaplicki et al. |
| 2003/0186049 A1 | 10/2003 | Czaplicki et al. |
| 2003/0187129 A1 | 10/2003 | Bell et al. |
| 2004/0033324 A1 | 2/2004 | Meyer |
| 2004/0048060 A1 | 3/2004 | Kassa |
| 2004/0048078 A1 | 3/2004 | Czaplicki et al. |
| 2004/0063800 A1 | 4/2004 | Brantl et al. |
| 2004/0079478 A1 | 4/2004 | Merz |
| 2004/0131839 A1 | 7/2004 | Eagle |
| 2004/0131840 A1 | 7/2004 | Ferguson et al. |
| 2004/0180193 A1 | 9/2004 | Oda et al. |
| 2004/0181013 A1 | 9/2004 | Schenkel |
| 2004/0197545 A1 | 10/2004 | Gehlsen et al. |
| 2004/0202881 A1 | 10/2004 | Everaerts et al. |
| 2004/0221953 A1 | 11/2004 | Czaplicki et al. |
| 2004/0229000 A1 | 11/2004 | Khandpur et al. |
| 2004/0234774 A1 | 11/2004 | Cheng et al. |
| 2004/0266898 A1 | 12/2004 | Kassa et al. |
| 2005/0003222 A1 | 1/2005 | Everaerts et al. |
| 2005/0016677 A1 | 1/2005 | Carlson et al. |
| 2005/0020703 A1 | 1/2005 | Czaplicki et al. |
| 2005/0048276 A1 | 3/2005 | Wilson |
| 2005/0119372 A1 | 6/2005 | Czaplicki et al. |
| 2005/0154089 A1 | 7/2005 | Taylor et al. |
| 2005/0159511 A1 | 7/2005 | Kramer |
| 2005/0159531 A1 | 7/2005 | Ferng et al. |
| 2005/0221046 A1 | 10/2005 | Finerman |
| 2005/0230027 A1 | 10/2005 | Kassa et al. |

FOREIGN PATENT DOCUMENTS

| | | |
|---|---|---|
| DE | 199 19 783 A1 | 11/2000 |
| EP | 0 360 214 A2 | 3/1990 |
| EP | 0 383 498 | 8/1990 |
| EP | 0 442 178 A1 | 8/1991 |
| EP | 0 819 723 A1 | 1/1998 |
| EP | 0 893 332 | 1/1999 |
| EP | 1 123 348 | 9/1999 |
| EP | 1 022 320 A1 | 7/2000 |
| EP | 1 055 699 A1 | 11/2000 |
| EP | 1 072 647 A2 | 1/2001 |
| EP | 1 122 152 | 8/2001 |
| EP | 1 149 679 | 10/2001 |
| EP | 0 703 931 B1 | 10/2003 |
| EP | 1 240 266 B1 | 2/2004 |
| EP | 0 851 894 B1 | 4/2004 |
| EP | 1 272 587 B1 | 5/2004 |
| EP | 1 155 084 B1 | 6/2004 |
| EP | 1 431 325 A1 | 6/2004 |
| EP | 1 075 498 B1 | 7/2004 |
| EP | 0 820 491 B1 | 8/2004 |
| EP | 0 947 529 B1 | 8/2004 |
| EP | 1 185 595 B1 | 8/2004 |
| EP | 1 252 217 B1 | 8/2004 |
| EP | 1 449 868 A1 | 8/2004 |
| EP | 1 023 413 B1 | 9/2004 |
| EP | 1 155 082 B1 | 9/2004 |
| EP | 1 305 376 B1 | 9/2004 |
| EP | 1 155 053 B1 | 10/2004 |
| EP | 1 163 308 B1 | 10/2004 |
| EP | 1 471 105 A2 | 10/2004 |
| EP | 1 001 893 B1 | 11/2004 |
| EP | 1 115 770 B1 | 11/2004 |
| EP | 1 187 888 B1 | 11/2004 |
| EP | 1 574 537 A1 | 9/2005 |
| EP | 1 602 702 | 12/2005 |
| GB | 903 146 | 8/1962 |
| JP | 56-004432 | 1/1981 |
| JP | 57-117542 | 7/1982 |

| | | |
|---|---|---|
| JP | 04059819 | 2/1992 |
| JP | 4059820 A | 2/1992 |
| JP | 9249730 A | 9/1997 |
| JP | 09-316169 | 12/1997 |
| JP | 09316169 A * | 12/1997 |
| WO | WO 95/33785 | 12/1995 |
| WO | WO 97/02967 | 1/1997 |
| WO | WO 97/12929 | 4/1997 |
| WO | WO 97/19124 | 5/1997 |
| WO | WO 98/36944 | 8/1998 |
| WO | WO 98/52997 | 11/1998 |
| WO | WO 99/02578 | 1/1999 |
| WO | WO 00/12571 | 3/2000 |
| WO | WO 00/12595 | 3/2000 |
| WO | WO 00/13876 | 3/2000 |
| WO | WO 00/20483 | 4/2000 |
| WO | WO 00/37242 | 6/2000 |
| WO | WO 00/37554 | 6/2000 |
| WO | WO 00/39232 | 7/2000 |
| WO | WO 00/40629 | 7/2000 |
| WO | WO 00/52086 | 9/2000 |
| WO | WO 01/19667 | 3/2001 |
| WO | WO 01/57130 A1 | 8/2001 |
| WO | WO 01/88033 A1 | 11/2001 |
| WO | WO 02/070620 A1 | 9/2002 |
| WO | WO 02/088214 A1 | 11/2002 |
| WO | WO 03/011954 A1 | 2/2003 |
| WO | WO 03/040251 A1 | 5/2003 |
| WO | WO 03/054069 A1 | 7/2003 |
| WO | WO 03/059997 A1 | 7/2003 |
| WO | WO 03/072677 A1 | 9/2003 |
| WO | WO 03/078163 | 9/2003 |
| WO | WO 03/078163 A1 | 9/2003 |
| WO | WO 03/095575 | 11/2003 |
| WO | WO 2004/050740 A1 | 6/2004 |
| WO | WO04/055092 | 7/2004 |
| WO | WO 04/060956 A1 | 7/2004 |
| WO | WO 2004/055092 A1 | 7/2004 |
| WO | WO 2004/060984 A1 | 7/2004 |
| WO | WO 2004/062869 A2 | 7/2004 |
| WO | WO 2004/065485 A1 | 8/2004 |
| WO | WO04/076507 | 9/2004 |
| WO | WO 2004/076507 A2 | 9/2004 |
| WO | WO 2004/085510 A1 | 10/2004 |
| WO | WO 2004/085564 A1 | 10/2004 |
| WO | WO 2004/099312 A1 | 11/2004 |
| WO | WO 05/007720 | 1/2005 |
| WO | WO 05/047393 | 5/2005 |
| WO | WO05/090431 | 9/2005 |
| WO | WO05/090455 | 9/2005 |
| WO | WO05/095484 | 10/2005 |
| WO | WO05/108456 | 11/2005 |
| WO | WO05/113627 | 12/2005 |

OTHER PUBLICATIONS

International Search Report dated Feb. 24, 2005. PCT/US2004/020112. (1001.141WO).

Zalobsky et al., Recommendations on Selection and Use of Cavity Reinforcement Materials: Proceedings of the 1999 Noise and Vibration Conference.

Weber et al., "Chacterizing the In Vehicle Performance of Expandable Sealants Used As Acoustic Baffles", Proceedings of the 1999 Noise and Vibrations Conference.

Weber et al., "Requirements for Improved Performance of Specialty Sealing and Bonding Materials for Automotive Applications" SAE 2000 World Congress, Mar. 6-9, 2000.

Liu et al., "Validation of Epoxy Foam for Structural and Crash Application". 2004 SAE World Congress, Mar. 8-11, 2004.

Schulenburg et al., "Structrual Adhesives-Improvements in Vehicle Crash Performance", 2004 SAE World Congress, Mar. 8-11, 2004.

Casey et al., "Expandable Epoxy Foam: A Systematic Approach to Improve Vehicle Performance", 2004 SAE World Congress, Mar. 8-11, 2004.

"The Epoxy Book", A System Three Resins Publication, pp. 1-41, System Three Resins, Inc., Seattle, Washington.

"Epoxy Resins", Second Edition Encyclopedia of Polymer Science and Engineering, vol. 6, pp. 322-382, 1985.

Born, Peter and Bernd Mayer, "Structural Bonding in Automotive Applications", AutoTechnology, Apr. 2004, pp. 44-47.

Copending U.S. Appl. No. 10/783,326, filed Feb. 20, 2004.

Copending U.S. Appl. No. 10/847,016, filed May 17, 2004.

Copending U.S. Appl. No. 10/873,935, filed Jun. 22, 2004 (formerly U.S. Appl. No. 60/482,896, filed Jun. 26, 2003).

Copending U.S. Appl. No. 60/542,029, filed Feb. 5, 2004.

* cited by examiner

EXPANDABLE MATERIAL

CLAIM OF BENEFIT OF FILING DATE

The present application claims the benefit of the filing date of U.S. Provisional Application Ser. No. 60/482,897, filed Jun. 26, 2003, hereby incorporated by reference.

FIELD OF THE INVENTION

The present invention relates generally to an expandable material. More preferably, the present invention relates to an expandable material that exhibits a property such as substantially homogeneous expansion, a high level of expansion, improved cohesiveness, a combination thereof or the like.

BACKGROUND OF THE INVENTION

For many years, industry has been concerned with designing materials such as adhesives, baffle materials, structural materials or the like, which exhibit desired characteristics. As examples, the transportation industry and, particularly, the automotive industry has been concerned with designing expandable materials that exhibit characteristics such as low weight, good adhesion, sound absorption, sound damping, relatively high levels of expansion, homogeneous expansion, consistent or predictable expansion or other desired characteristics. Design of such materials with two or more of these characteristics can present difficulties however. For example, it can be difficult to provide an expandable material that exhibits a relatively high level of expansion without sacrificing characteristics such as adhesion, homogeneity of expansion or the like. Thus, the present invention seeks to provide an expandable material that exhibits at least one desired characteristic without significantly sacrificing the presence of at least one other desired characteristic.

SUMMARY OF THE INVENTION

Accordingly, the present invention provides an expandable material, which may be employed for sealing, baffling, reinforcing, structural bonding or the like of a variety of structures. The material is typically an expandable adhesive material and also typically includes one or more of the following components: a polymeric admixture; an epoxy resin; a filler; a blowing agent; a curing agent; an accelerator for the blowing agent or the curing agent; a tackifier; a coagent; an anti-oxidant; combinations thereof or the like. Preferably, the polymeric admixture includes an acrylate, an acetate or both, although not required. One preferred reinforcement material is a pulped form of aramid fiber, which can assist in flow control, sag resistance and/or self-support ability of the material.

The material may be formed according to a variety of protocols. In one preferred method, the various components of the material are intermixed in one or more continuous or batch-type mixing processes or a combination thereof. The material may be applied (e.g., adhered) to a variety of structures, which may be formed of a variety of materials such as aluminum, magnesium, steel, sheet molding compound, bulk molding compound, thermoplastics, combinations thereof or the like. Moreover the material may be employed in a variety of applications such as baffling, sealing, reinforcement of the like.

DETAILED DESCRIPTION OF THE INVENTION

The present invention is predicated upon providing an improved expandable material, and articles incorporating the same. The expandable material preferably expands upon activation by heat or other condition. Preferably, although not required, the expandable material can exhibit relatively high levels of expansion while maintaining homogeneity of expansion and/or without experiencing cohesive failure. Additionally, it has been found that the expandable material is particularly useful in applications such as providing sound absorption, baffling or sealing to articles of manufacture such as automotive vehicles.

In a typical application, the expandable material can assist in providing, baffling, adhesion, sealing, acoustical damping properties, reinforcement or a combination thereof within a cavity of or upon a surface of a structure, or to one or more members (e.g., a body panel or structural member) of an article of manufacture (e.g., an automotive vehicle).

The expandable material preferably includes a combination of three or more of the following components:
(a) up to about 85 parts by weight of a polymeric material admixture such as an admixture of acrylates, acetates or the like;
(b) up to about 20 parts by weight epoxy resin;
(c) up to about 20 parts by weight of a tackifier such as a hydrocarbon resin;
(d) up to about 25 parts by weight blowing agent;
(e) up to about 10 parts by weight curing agent; and
(f) up to about 40 parts by weight filler.

The expandable material of the present invention may be applied to various articles of manufacture for providing acoustical damping to the articles, for sealing the articles or for providing reinforcement to the articles. Examples of such articles of manufacture include, without limitation, household or industrial appliances, furniture, storage containers, buildings, structures or the like. In preferred embodiments, the expandable material is applied to portions of an automotive vehicle such as body or frame members (e.g., a vehicle frame rail) of the automotive vehicle. One method of the present invention contemplates applying the expandable material to a surface of one of the above structures in an unexpanded or partially expanded state and activating the material for expanding it to a volume greater than its volume in the unexpanded state (e.g., 1000% greater, 2000% greater, 2500% greater, 3000% greater, 3500% greater or higher).

Percentages herein refer to weight percent, unless otherwise indicated.

Polymeric Material Admixture

The expandable material typically include polymeric material admixture, which may include a variety of different polymers, such as thermoplastics, elastomers, plastomers combinations thereof or the like. For example, and without limitation, polymers that might be appropriately incorporated into the polymeric admixture include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

The polymeric admixture typically comprises a substantial portion of the expandable material (e.g., up to 85% by weight or greater). Preferably, the polymeric admixture comprises about 25% to about 85%, more preferably about 40% to about 75% and even more preferably about 50% to about 70% by weight of the expandable material.

Although not required, it is preferable for the polymeric admixture to include one or more acrylates. The acrylates may include, for example, simple acrylate, methyl acrylate, ethyl acrylate, butyl acrylate, vinyl acrylate, copolymers or combinations thereof or the like. Moreover, any of these acrylates may include other chemical groups such as epoxy, ethylene, butylene, pentene or the like for forming compounds such as ethylene acrylate, ethylene methyl acrylate and so on, and additionally for forming copolymers or combinations thereof or the like. When included, the one or more acrylates typically comprise about 20% or less to about 95% or greater, more preferably about 40% to about 85% and even more preferably about 55% to about 75% by weight of the polymeric admixture.

A preferred acrylate is a copolymer of butyl acrylate and methyl acrylate and more particularly a copolymer of an ethylene butyl acrylate and ethylene methyl acrylate. An example of such a copolymer is sold under the tradename LOTRYL 35BA40 and is commercially available from ATOFINA Chemical, Inc., 2000 Market Street, Philadelphia, Pa. 19103. Another preferred acrylate is an epoxy modified (e.g., epoxidized) acrylate copolymer. An example of such a copolymer is sold under the tradename ELVALOY 4170 and is commercially available from E. I. Dupont De Nemours and Company, 1007 Market Street, Wilmington, Del. 19898.

It is also preferable, although again, not required, that the polymeric admixture include one or more acetates. The acetates may include, for example, acetate, methyl acetate, ethyl acetate, butyl acetate, vinyl acetate, copolymers or combinations thereof or the like. Moreover, any of these acetates may include other chemical groups such as epoxy, ethylene, butylene, pentene or the like for forming compounds such as ethylene acrylate, ethylene methyl acrylate and so on and additionally for forming copolymers or combinations thereof or the like. When included, the one or more acetates typically comprise about 5% or less to about 50% or greater, more preferably about 7% to about 35% and even more preferably about 15% to about 25% by weight of the polymeric admixture.

A preferred acetate is ethylene vinyl acetate (EVA). One example of such an acetate is a relatively high ethylene content EVA sold under the tradename ESCORENE UL-7760, commercially available from ExxonMobil Chemical, 13501 Katy Freeway, Houston, Tex. 77079-1398. Another example of such an acetate is a relatively low molecular weight/low melt index EVA sold under the tradename ESCORENE UL-MV02514, commercially available from Exxon Mobile Chemical, 13501 Katy Freeway, Houston, Tex. 77079-1398.

Epoxy Resin

Epoxy resin is used herein to mean any of the conventional dimeric, oligomeric or polymeric epoxy materials containing at least one epoxy functional group. The polymer-based materials may be epoxy containing materials having one or more oxirane rings polymerizable by a ring opening reaction. In preferred embodiments, the expandable material includes up to about 20% of an epoxy resin. More preferably, the expandable includes between about 0.1% and 10% by weight epoxy resin.

The epoxy may be aliphatic, cycloaliphatic, aromatic or the like. The epoxy may be supplied as a solid (e.g., as pellets, chunks, pieces or the like) or a liquid (e.g., an epoxy resin). The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

Preferably, an epoxy resin is added to the expandable material to increase properties such as adhesion, cohesion or the like of the material. Additionally, the epoxy resin may strengthen cell structure when the expandable material is a foamable material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive.

Tackifier

A variety of tackifiers or tackifying agents may be included in the expandable material. Exemplary tackifiers include, without limitation, resins, phenolic resins (e.g., thermoplastic phenolic resins), aromatic resins, synthetic rubbers, alcohols or the like. According to one preferred embodiment, a hydrocarbon resin 9 (e.g., a C5 resin, a C9 resin, a combination thereof or the like) is employed as a tackifier. The hydrocarbon resin may be saturated, unsaturated or partially unsaturated (i.e., have 1, 2, 3 or more degrees of unsaturation). One example of a preferred hydrocarbon resin is a coumarone-indene resin. Another example of a preferred hydrocarbon resin is sold under the tradename NORSELENE® S-105 and is commercially available from Sartomer Company, Inc., 502 Thomas Jones Way, Exton, Pa. 19341.

When used, the tackifer preferably comprises about 0.1% or less to about 30% or greater, more preferably about 2% to about 25% and even more preferably about 6% to about 20% by weight of the expandable material. Advantageously, the tackifier may be able to assist in controlling cure rates for producing a more consistent or predictable expansion for the expandable material.

Blowing Agent

One or more blowing agents may be added to the expandable material for producing inert gasses that form, as desired, an open and/or closed cellular structure within the expandable material. In this manner, it may be possible to lower the density of articles fabricated from the material. In addition, the material expansion helps to improve sealing capability, substrate wetting ability, adhesion to a substrate, acoustic damping, combinations thereof or the like.

The blowing agent may include one or more nitrogen containing groups such as amides, amines and the like. Examples of suitable blowing agents include azodicarbonamide, dinitrosopentamethylenetetramine, 4,4$_t$-oxy-bis-(benzenesulphonylhydrazide), trihydrazinotriazine and N,N$_t$-dimethyl-N,N$_t$-dinitrosoterephthalamide.

An accelerator for the blowing agents may also be provided in the expandable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles, ureas or the like.

Amounts of blowing agents and blowing agent accelerators can vary widely within the expandable material depending upon the type of cellular structure desired, the desired amount of expansion of the expandable material, the desired rate of expansion and the like. Exemplary ranges for the amounts of blowing agents, blowing agent accelerators or both together in the expandable material range from about 0.1% by weight to about 25%, more preferably about 2% to about 20% and even more preferably about 7% to about 15% by weight of the expandable material.

In one embodiment, the present invention contemplates the omission of a blowing agent. Thus it is possible that the material will not be an expandable material. Preferably, the formulation of the present invention is thermally activated. However, other agents may be employed for realizing activation by other means, such as moisture, radiation, or otherwise.

Curing Agent

One or more curing agents and/or curing agent accelerators may be added to the expandable material. Amounts of curing agents and curing agent accelerators can, like the blowing agents, vary widely within the expandable material depending upon. the type of cellular structure desired, the desired amount of expansion of the expandable material, the desired rate of expansion, the desired structural properties of the expandable material and the like. Exemplary ranges for effective amounts of the curing agents, curing agent accelerators of both together present in the expandable material range from about 0% by weight to about 7% by weight.

Preferably, the curing agents assist the expandable material in curing by crosslinking of the polymers, epoxy resins (e.g., by reacting in stoichiometrically excess amounts of curing agent with the epoxide groups on the resins) or both. It is also preferable for the curing agents to assist in thermosetting the expandable material. Useful classes of curing agents are materials selected from aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), peroxides or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the expandable material.

Though longer curing times are also possible, curing times of less than 5 minutes, and even less than 30 seconds are possible for the formulation of the present invention. Moreover, such curing times can depend upon whether additional energy (e.g., heat, light, radiation) is applied to the material or whether the material is cured at room temperature.

Filler

The expandable material may also include one or more fillers, including but not limited to particulated materials (e.g., powder), beads, microspheres, nanoparticles or the like. Preferably the filler includes a relatively low-density material that is generally non-reactive with the other components present in the expandable material.

Examples of fillers include silica, diatomaceous earth, glass, clay, talc, pigments, colorants, glass beads or bubbles, glass, carbon ceramic fibers, antioxidants, and the like. Such fillers, particularly clays, can assist the expandable material in leveling itself during flow of the material. The clays that may be used as fillers may include nanoparticles of clay and/or clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide. might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular improved the impact resistance of the cured expandable material.

When employed, the fillers in the expandable material can range from 1% to 90% by weight of the expandable material. According to some embodiments, the expandable material may include from about 3% to about 30% by weight, and more preferably about 10% to about 20% by weight clays or similar fillers.

It is contemplated that one of the fillers or other components of the material may be thixotropic for assisting in controlling flow of the material as well as properties such as tensile, compressive or shear strength.

Other Additives

Other additives, agents or performance modifiers may also be included in the expandable material as desired, including but not limited to a UV resistant agent, a flame retardant, an impact modifier, a heat stabilizer, a UV photoinitiator, a colorant, a processing aid, an anti-oxidant, a lubricant, a coagent, a reinforcement (e.g., chopped or continuous glass, glass fiber, ceramics and ceramic fibers, aramid fibers, aramid pulp, carbon fiber, acrylate fiber, polyamide fiber, polypropylene fibers, combinations thereof or the like). In one preferred embodiment, for example, an acrylate coagent may be employed for enhancing cure density. It is also contemplated that the expandable material may include about 0.10 to about 5.00 weight percent of an anti-oxidant such as a propionate (e.g., pentaerythritol tetrakis (3-(3,5-di-tert-butyl-4-hydroxyphenyl) propionate)) for assisting in controlling oxidation, cure rate or both. An example of such an anti-oxidant is sold under the tradename IRGANOX® 1010 and is commercially available from Ciba Specialty Chemicals Company, 141 Klybeckstrasse, Posffach, 4002 Basel, Switzerland.

When determining appropriate components for the expandable material, it may be important to form the material such that it will only activate (e.g., flow, foam or otherwise change states) at appropriate times or temperatures. For instance, in most applications, it is undesirable for the material to be reactive at room temperature or otherwise at the ambient temperature in a production environment. More typically, the expandable material becomes activated to flow at higher processing temperatures. As an example, temperatures such as those encountered in an automobile assembly plant may be appropriate, especially when the expandable material is processed along with the other components at elevated temperatures or at higher applied energy levels, e.g., during painting preparation steps. Temperatures encountered in many coating operations (e.g., in a paint curing oven), for instance, range up to about 180° C. or higher, 200° C. or higher, 250° C. or higher.

For mixing the additives, fillers or both, it may be preferable for the additives or fillers to be mixed with a dispersant prior to mixing them with the other ingredients of the expandable material. Such a dispersant will typically have a relatively low molecular weight of less than about 100,000 amu, more preferably less than about 50,000 amu and still more preferably less than about 10,000 amu, although not required. Examples of such dispersants include, without limitation, liquid waxes, liquid elastomers or the like such as ethylene-propylene rubber (EPDM), paraffins (e.g., paraffin wax).

When the material is expandable, it is possible to make a family of materials according to the present invention wherein the members of the family have different expansion levels. Such a family is, at least in part, may be formed by varying the amount of blowing agent, blowing agent accelerator or both. For exemplary purposes, table A is provided below for showing amounts of blowing agents and/or blowing agent accelerators for one particular family that may be formed according to the present invention along with exemplary levels of expansion for materials in the family.

TABLE A

| Weight Percent of Blowing Agent, Blowing Agent Accelerator or Both | Percent Volume of Expanded Material as Compared to Non-Expanded Material |
| --- | --- |
| Up to 1.5% or 2.0% or greater | Up to About 300% to about 400% or greater |
| Up to 3.0% or 3.5% or greater | Up to About 700% to about 800% or greater |
| Up to 5.0% or 5.5% or greater | Up to About 1150% to about 1250% or greater |
| Up to 7.0% or 8% or greater | Up to About 1550% to about 1750% or greater |
| Up to 9.0% or 10% or greater | Up to About 2100% to about 2250% or greater |
| Up to 13% or 14% or greater | Up to About 2900% to about 3000% or greater |

For balancing out the formulation, it may be desirable for a filler (e.g., a mineral filler) to replace the weight percent of blowing agent or blowing agent accelerator that is removed for materials having lower expansion. As an example, if 5 weight percent of the material is removed by removing blowing agent or accelerator, it may be desirable to replace the 5 weight percent with filler.

Highly Preferred Embodiments and Examples

It is contemplated within the present invention that polymers or other materials other than those discussed above may also be incorporated into the expandable material, e.g., by copolymerization, by blending, or otherwise. Below, exemplary formulations of the expandable material are provided. Since they are merely exemplary, it is contemplated that the weight percents of the various ingredients may vary by ±75% or more or by ±50% or ±30%. Moreover, ingredients may be added or removed from the formulations.

EXAMPLE

Table B shows a formulation for one exemplary expandable material.

TABLE B

| Ingredient name: | % by weight |
| --- | --- |
| Copolymer of Ethylene Butyl Acrylate and Ethylene Methyl Acrylate | 34.20 |
| High Ethylene content Ethylene Vinyl Acetate | 15.00 |
| Epoxy Modified Acrylate Copolymer | 6.00 |
| Low Molecular Weight Ethylene Vinyl Acetate | 6.00 |
| Epoxy resin | 1.00 |
| A tackifier resin or agent (e.g., a hydrocarbon resin, a rosin ester, a terpentine) | 11.70 |
| Acrylate coagent for cure density control (e.g., dipentaerythritol pentaacrylate) | 0.60 |
| Curing agent (e.g., peroxide based curing agent) | 1.50 |
| Curing agent - 60° C.–110° C. activation | 0.20 |
| Americure curing agent | 0.10 |
| Blowing agent accelerator (e.g., Zinc Oxide) | 1.50 |
| Blowing agent (e.g., azodicarbonamide) | 9.00 |
| Around 30% Aramid pulp + around 70% EPDM | 1.0 |
| Pigment | 0.2 |
| Calcium carbonate | 11.5 |
| Anti-oxidant | 0.5 |

Formation and Application of the Expandable Material

Formation of the expandable material can be accomplished according to a variety of new or known techniques. Preferably, the expandable material is formed as a material of substantially homogeneous composition. However, it is contemplated that various combining techniques may be used to increase or decrease the concentration of certain components in certain locations of the expandable material.

According to one embodiment, the expandable material is formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a single homogenous composition.

According to another embodiment, the expandable material may be formed by heating one or more of the components that is generally easier to soften or liquidize such as the polymer based materials to induce those components into a mixable state. Thereafter, the remaining components may then be intermixed with the softened components. It should be understood that the various ingredients of the expandable material may be combined in any desired order. Moreover, the component of the polymeric admixture may be mixed together and then added to the other ingredients or may be combined with the other ingredients in any other order.

Depending upon the components used, it may be important to assure that the temperature of the components remains below certain activation temperatures that might cause the expandable material to activate (e.g., form gasses, flow or otherwise activate), cure (e.g., harden, stiffen or otherwise change states) or both. Notably, when the expandable material contains a blowing agent, it is typically desirable to maintain the temperature of the expandable material below a temperature that will activate the blowing agent during formation of the expandable material or before the expandable material is applied to a surface.

In situations where it is desirable to maintain the expandable material at lower temperatures it may be desirable to maintain the components in a semi-solid or viscoelastic state using pressure or a combination of pressure and heat to intermix the components of the expandable material. Various machines have been designed to applying heat, pressure or both to materials. One preferred machine is an extruder. According to one embodiment of the present invention, various components may be premixed into one, two or more pre-mixtures and introduced at one or various locations in a single or twin-screw extruder. Thereafter, the heat and pressure provided by the extruder mixes the expandable material in a single generally homogeneous composition, and preferably does so without activating the material.

Activation of the material may include at least some degree of foaming or bubbling in situations where the expandable material includes a blowing agent. Such foaming or bubbling can assist the expandable material in wetting a substrate and forming an intimate bond with the substrate. Alternatively, however, it shall be recognized that the expandable material may be activated to flow without foaming or bubbling and may still substantially wet the substrate to form an intimate bond. Formation of the intimate bond will typically but not necessarily occur upon curing of the expandable material. In one embodiment, a robotic extrusion applicator is employed, e.g., of the type disclosed in U.S. Pat. No. 5,358,397, hereby incorporated by reference.

Other applications for which the present technology may be adapted or employed as an expandable material include those of the type identified in U.S. Pat. Nos. 6,358,584; 6,311,452; 6,296,298, all of which are hereby incorporated by reference. The material of the present invention may thus be applied to a carrier, such as a molded, extruded or stamped member (e.g., metal or plastic, foamed or unfoamed; exemplary materials of which include aluminum, magnesium, titanium, steel, polyamide (e.g., nylon 6 or nylon 6,6), polysulfone, thermoplastic imide, polyether imide, polyether sulfone or mixtures thereof. Other examples of preferred applications are disclosed and discussed in commonly owned patent application titled "Fastenable Member for Sealing, Baffling, or Reinforcing and Method of Forming Same", Attorney Docket No. 1001-142P1 filed on the same date herewith.

Advantageously, certain embodiments of the present invention have exhibited relatively high levels of expansion coupled with homogeneity and/or cohesiveness during such expansion. Thus, upon expansion, the expandable material can fill relatively large open spaces (e.g., cavities) while exhibiting improved properties for sealing, baffling, sound absorption or the like.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An expandable material, comprising:
   about 10% to about 70% by weight of a polymeric admixture, the polymeric admixture including one or more acrylates and one or more acetates;
   about 6.0% to about 20% tackifier, the tackifier being a hydrocarbon resin;
   about 0.1% to about 10% by weight epoxy resin;
   5.5% or greater blowing agent, blowing agent accelerator or both;
   a curing agent; and
   one or more fillers, the one or more fillers including calcium carbonate or aramid pulp;
   wherein, upon exposure to a temperature greater than about 180° C., the expandable material expands to a volume that is at least 2000% greater than the volume of the expandable material in an unexpanded state.

2. An expandable material as in claim 1 further comprising a dispersant.

3. An expandable material as in claim 2 wherein the molecular weight of the dispersant is less than about 50,000 amu.

4. An expandable material as in claim 3 wherein the dispersant is selected from a paraffin wax or an EPDM.

5. An expandable material as in claim 1 wherein the one or more fillers includes calcium carbonate and aramid pulp.

6. An expandable material as in claim 1 wherein, upon exposure to elevated temperature, the expandable material expands to at least 3000% of its original size.

7. An expandable material as in claim 1 wherein the polymeric admixture is at least about 40% of the expandable material and the one or more acrylates comprise about 40% to about 85% of the polymeric admixture and the one or more acetates comprise about 15% to about 25% of the polymeric admixture.

8. An expandable material as in ctaim 1 further comprising an anti-oxidant.

9. An expandable material as in claim 1 wherein the epoxy resin is a solid.

10. An expandable material as in claim 1 wherein the curing agent is peroxide based.

11. An expandable material as in claim 1 wherein the curing agent has an activation temperature between about 60° C. and about 110° C.

12. An expandable material as in claim 1 wherein the one or more fillers include a fibrous filler material.

13. An expandable material as in claim 1 wherein the one or more fillers includes an aramid pulp.

14. An expandable material as in claim 1 wherein, the curing agents include a peroxide based curing agent and the hydrocarbon resin includes a hydrocarbon with two or more degrees of unsaturation.

15. An expandable material as in claim 1 wherein the polymeric admixture is at least about 40% by weight of the expandable material and the one or more acrylates comprise about 20% to about 95% of the polymeric admixture and the one or more acetates comprise about 5% to about 50% of the polymeric admixture.

16. An expandable material, comprising:
   about 10% to about 70% by weight of a polymeric admixture, the polymeric admixture including:
   i) about 20% to about 95% of one or more acrylates, the one or more acrylates including epoxidized acrylate copolymer and a copolymer of an ethylene butyl acrylate and ethylene methyl acrylate and an acrylate coagent; and
   ii) about 5% to about 50% of one or more acetates, the one or more acetates including a relatively high content ethylene vinyl acetate and relatively low melt index ethylene vinyl acetate;
   about 6.0% to about 20% tackifier, the tackifier being a hydrocarbon having two or more degress of unsaturation;
   about 0.1% to about 10% by weight epoxy resin, the epoxy resin including at least one of a novalac type resin or a bisphenol resin;

8% or greater blowing agent and blowing agent accelerator, the blowing agent being selected from an amine or amide and the blowing agent accelerator being selected from a metal salt or an oxide;
a peroxide based curing agent;
about 3% to about 30% one or more fillers, the one or more fillers including calcium carbonate and aramid pulp; and
a dispersant, the dispersant being EPDM
wherein, upon exposure to elevated temperature, the expandable material expands to at least 3000% of its original size.

17. An expandable material as in claim 16 wherein the molecular weight of the dispersant is less than about 50,000 amu.

18. An expandable material as in claim 16 wherein, upon exposure to elevated temperature, the expandable material expands to at least 3500% of its original size.

19. An expandable material as in claim 16 further comprising a curing agent having an activation temperature between about 60° C. and about 110° C.

* * * * *